Jan. 12, 1971  D. F. FISCUS ET AL  3,554,613
SKID CONTROL SENSING DEVICE
Filed Sept. 24, 1968  2 Sheets-Sheet 1
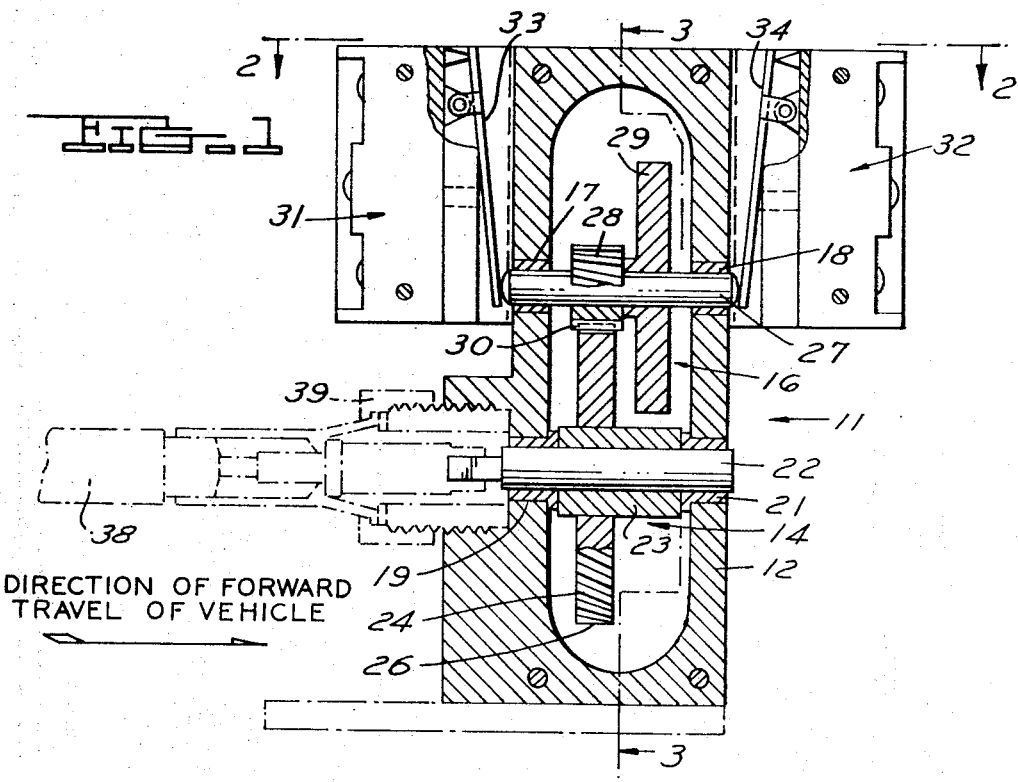
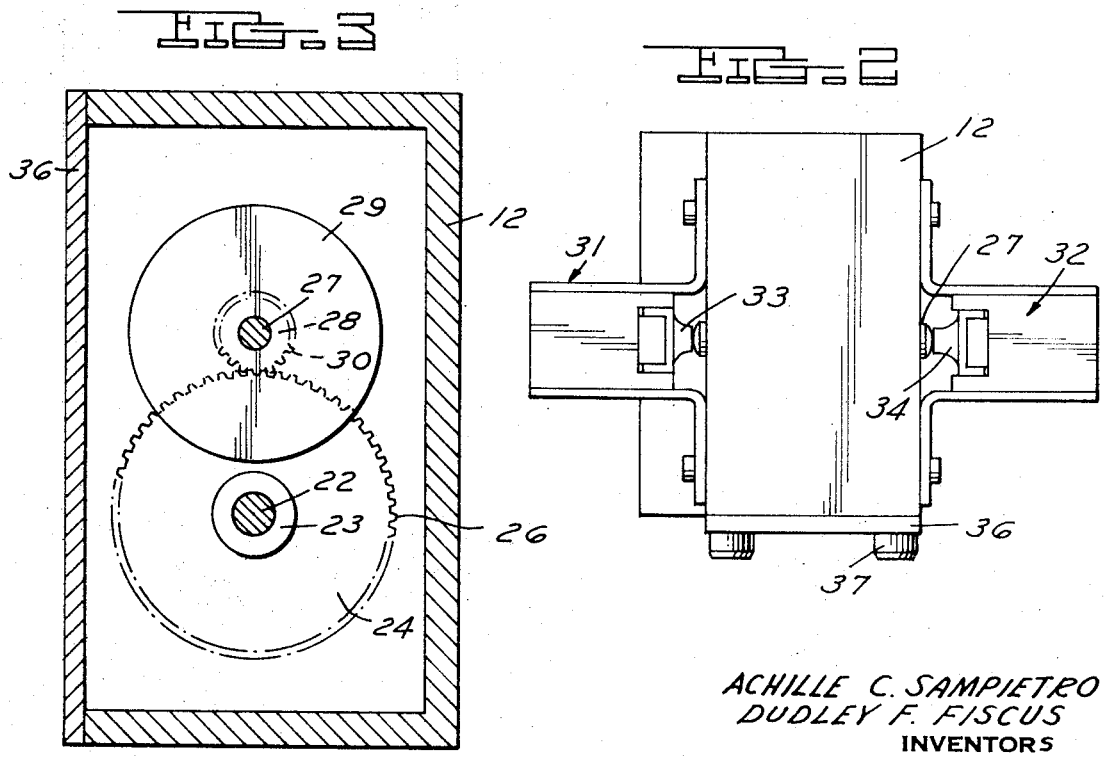
ACHILLE C. SAMPIETRO
DUDLEY F. FISCUS
INVENTORS
BY
John R. Faulkner
Roger E. Erickson
ATTORNEYS

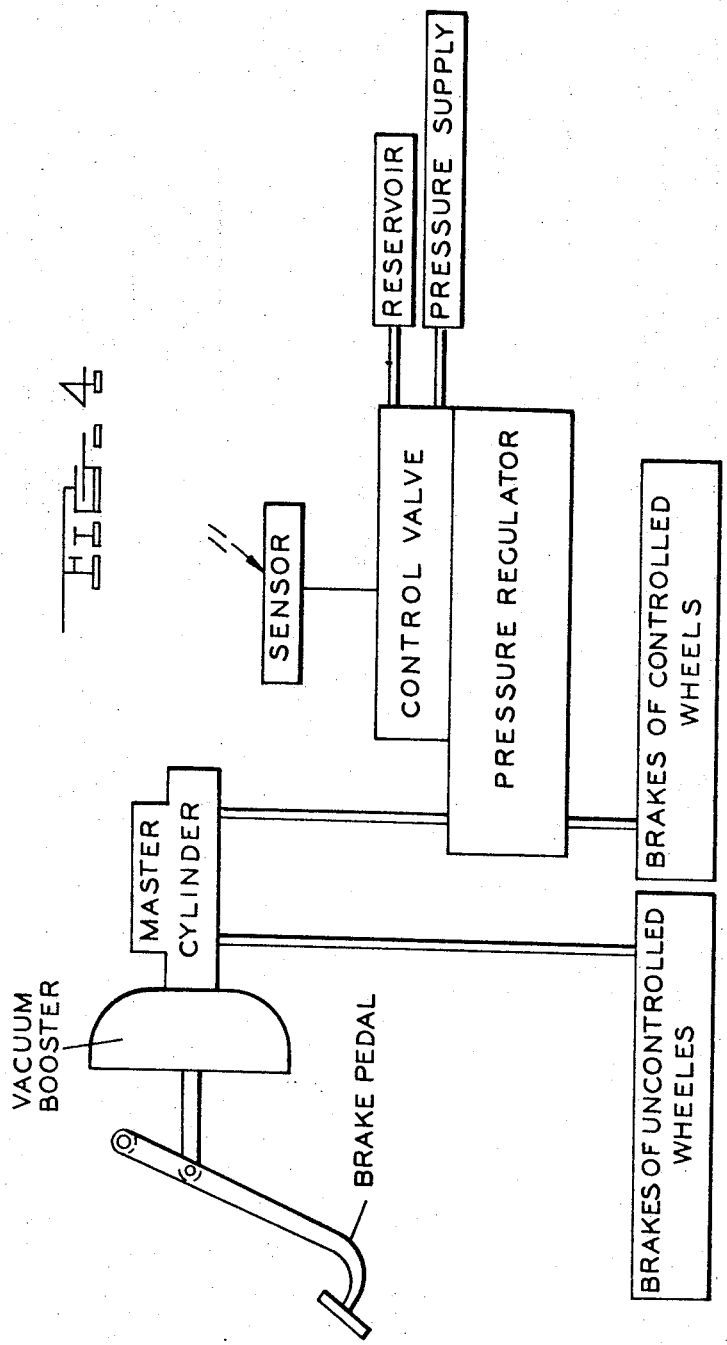

United States Patent Office 3,554,613
Patented Jan. 12, 1971

---

3,554,613
SKID CONTROL SENSING DEVICE
Dudley F. Fiscus, Livonia, and Achille C. Sampietro, Bloomfield Hills, Mich., assignors to Ford Motor Company, Dearborn, Mich., a corporation of Delaware
Filed Sept. 24, 1968, Ser. No. 761,967
Int. Cl. B60t 8/06, 8/12
U.S. Cl. 303—21         11 Claims

ABSTRACT OF THE DISCLOSURE

An automotive anti-skid brake control sensing device that compares the linear deceleration of a vehicle along its direction of travel with the angular deceleration of a vehicle wheel. The device incorporates two side-by-side helical gears having axes of rotation mounted parallel to the longitudinal axis of the vehicle. One of the gears is linearly displaceable in one direction of its axis of rotation to signal a skid condition.

BACKGROUND OF THE INVENTION

Research indicates that the minimum stopping distance of an automobile may be achieved, providing that a nearly maximum friction coefficient exists, when the vehicle tires experience slip relative to the road surface of about 14 to 30 percent. In addition, straight line directional stability of a vehicle may be maintained by preventing locking of its rear wheels. Development of practical mechanisms for automotive hydraulic brake system which substantially accomplish the above functions is one of the significant recent advances in automotive engineering.

A typical skid control mechanism includes a sensor, a control valve and a pressure regulator. The sensor detects the occurrence of a wheel skid and produces either a mechanical or electrical signal to the control valve. The control valve and pressure regulator, in renponse to the sensor signal, cause brake line pressure to be reduced thereby preventing wheel lock and permitting limited or controlled rotation of the vehicle wheel.

The invention described herein provides a sensor device for a skid control hydraulic brake system that compares the linear deceleration of the vehicle with the angular deceleration of a controlled wheel and which responds by providing a linear displacement of a magnitude proportional to the difference between the two decelerations.

The invention further provides a sensing means having a driving member and a driven inertia member which respond to skid conditions without having to overcome static friction between the driving and the driven members.

The invention provides a sensing means for automotive skid control systems which is relatively economical to manufacture and maintain and reliable in its operation.

SUMMARY OF THE INVENTION

A skid control sensor constructed in accordance with this invention includes first and second gear means mounted parallel in a housing. The gear means have helical teeth in mutual engagement and are rotatable relative to the housing. The first of the gear means rotates at an angular velocity proportional to the velocity of a vehicle wheel. The second of the gear means is driven by the first and is displaceable in the direction of its axis of rotation to register a wheel skid.

BRIEF DESCRIPTION OF THE DRAWING

FIG. 1 is a view of a preferred embodiment of the invention partly in cross-section and partly elevation.

FIG. 2 is an elevational view in the direction of the arrows 2—2 shown in FIG. 1.

FIG. 3 is a cross-sectional view along line 3—3 of FIG. 1.

FIG. 4 illustrates a schematic diagram of a hydraulic brake system embodying the invention.

DETAILED DESCRIPTION OF A PREFERRED EMBODIMENT

A skid sensing device constructed in accordance with this invention is identified generally in the drawings by numeral 11. The sensor 11 includes a housing or support means 12 which contains gear assemblies 14 and 16. A first pair of coaxial holes is formed in housing 12 into which cylindrical nylon bushings 17 and 18 are fitted. A second pair of coaxial holes is formed in housing 12 into which hat-shaped nylon bushings 19 and 21 are fitted. The axis of bushings 17 and 18 is parallel with that of bushings 19 and 21.

Gear assembly 14 includes shaft 22 that is rotatable within bushings 19 and 21. A collar portion 23 is rigidly secured about shaft 22 and engages the end portion of bushings 19 and 21. The gear portion 24 of assembly 14 has 45° right-hand helical teeth 26 and is rigidly secured to collar 23.

The second gear assembly 16 includes shaft 27 rotatable within bushings 17 and 18. Rigidly secured to shaft 27 are an inertia member 29 and a second helical gear 28 which has a diameter less than that of gear 24. The gear portion 28 of assembly 16 has 45° left-hand helical teeth 30 which engage teeth 26 of assembly 14. Gear assembly 16 is both angularly and axially displaceable relative to bushings 17 and 18 in response to linear and rotational inertia forces.

A cover plate 36 is secured to housing 12 by cap screws 37 to protect gear assemblies 14 and 16 from dirt and other foreign matter.

Electrical micro-switch assemblies 31 and 32 are mounted to opposite sides of housing 12 having actuating levers 33 and 34, respectively. Levers 33 and 34 are spring biased toward the adjacent ends of shaft 27 at all times and determine a normal axial position for gear assembly 16. Axial displacement of gear assembly 16 displaces levers 33 and 34 which in turn actuates switch 31 or 32.

A flexible shaft 38 and connector 39 (shown in phantom) is coupled to shaft 22 of gear assembly 14. The other end of flexible shaft 38 is connected to the speedometer cable drive shaft or other object which rotates at an angular velocity equal to or proportional to wheel speed.

OPERATION

Most skid control devices operate by releasing brake pressure before the wheels lock and reapplying the brakes as the wheels regain speed. FIG. 4 of the drawing shows diagrammatically such a skid control system that regulates the pressure of the rear wheel cylinders to prevent locking of the vehicle rear wheels.

In the system illustrated in FIG. 4, a wheel skid is detected by the sensor 11 which produces an electrical signal to the control valve. The control valve then actuates the pressure modulator which increases the volume and reduces the pressure within the hydraulic line of the controlled brake cylinders and thereby prevents rear wheel lock.

Sensor 11 is mounted in the vehicle so that the axes of rotation of gear assemblies 14 and 16 extend in the longitudinal direction of the vehicle as shown by the arrow in FIG. 1.

As the vehicle decelerates, two forces act upon the gear assembly 16. The first is the force due to the rotational inertia of assembly 16. More specifically, as gear assembly 14 decelerates with the vehicle wheel, the rotational inertia of gear assembly 16 resists this deceleration whereby a tangential force is set up between right-hand helical teeth 26 of gear assembly 14 and left-hand helical teeth 30 of gear assembly 16. The tooth angle produces an axial component of the tangential force along the axis of rotation of gear assembly 16 which urges gear assembly 16 leftwardly according to FIG. 1 toward the rear of the vehicle. The second axial force acting on gear assembly 16 is the force arising from the linear deceleration of the assembly 16, which urges assembly 16 rightwardly according ot FIG. 1 or in the direction of travel of the vehicle.

When vehicle braking occurs but no wheel skid is experienced, the two axial forces defined in the previous paragraph are equal and opposite and thus cancel each other. However, when skid occurs during braking the rotational inertia force component acting on gear assembly 16 exceeds the linear deceleration force and, as a result, gear assembly 16 is displaced toward the rear of the vehicle. The axial displacement of gear assembly 16 activates micro-switch 31, which causes a signal to be sent to the control valve and pressure modulator of the skid control system.

It may be seen that because the helical gear assemblies 14 and 16 are in relative motion at all times during skid or non-skid, no static friction between the two assemblies need be overcome for a skid to cause axial displacement of gear assembly 16.

The embodiment illustrated by FIGS. 1, 2 and 3 includes two separate switch assemblies 31 and 32. A deceleration skid would cause gear assembly 16 to be displaced leftwardly according to FIG. 1 and would actuate switch 31 only. An acceleration skid would cause gear assembly 16 to be displaced rightwardly according to FIG. 1 and would actuate switch 32 only. Thus, for use in a braking skid control system as illustrated by FIG. 4 where generally only deceleration skids are of concern, switch 32 could be eliminated and a simple biasing means substituted in its place.

The axial movement of gear assembly 16 may be used to actuate devices other than an electrical micro-switch. It should be understood that an air valve or vacuum servo-mechanism may also be used with the basic sensor depending in part upon the type of pressure modulator to be used.

The foregoing description presents the presently preferred embodiment of the invention. Further modifications and alterations will occur to those skilled in the arts that are included within the scope and spirit of this invention.

We claim:

1. A device to detect wheel skid during braking of a wheeled vehicle comprising:
   support means mounted to said vehicle,
   a pair of meshing helical gears rotatably mounted on said support means,
   one of said gears having an axis of rotation extending generally parallel to the direction of motion of said vehicle,
   said one gear being adapted to move relative to said support means in the direction of its axis of rotation in response to helical gear tooth thrust forces acting thereon, said thrust forces opposing linear inertia forces acting on said one gear due to deceleration of said vehicle, whereby the axial displacement of said one gear is an indication of wheel skid.

2. A device according to claim 1 wherein:
   the other of said gears is rotatable at an angular velocity proportional to the vehicle wheel angular velocity.

3. A device according to claim 1 wherein:
   said one gear includes a flywheel inertia member constructed to rotate therewith.

4. A device according to claim 1 and including:
   switch means actuated by said one gear assembly upon displacement thereof in the direction of its axis of rotation in response to wheel skid.

5. A device to detect wheel skid during braking of a wheeled vehicle comprising:
   support means mounted to said vehicle,
   a pair of meshing helical gears rotatably mounted on said support means,
   one of said gears having an axis of rotation extending generally parallel to the direction of motion of said vehicle,
   said one gear including inertia means displaceably responsive to angular deceleration of said first gear and to linear deceleration of said vehicle,
   said one gear being adapted to move relative to said support means in the direction of its axis of rotation in response to helical gear tooth thrust forces acting thereon, said thrust forces opposing inertia forces acting on said one gear due to deceleration of said vehicle, whereby axial displacement of said one gear is an indication of wheel skid.

6. A device to detect wheel skid during braking of a wheeled vehicle comprising:
   support means mounted to said vehicle,
   first and second meshing helical gears rotatably mounted on said support means having parallel axes of rotation extending generally in the direction of motion of said vehicle,
   said first gear adapted to rotate at an angular velocity proportional to the vehicle wheel angular velocity,
   said second gear means being linearly displaceable relative to said support means int he direction of its axis of rotation,
   said second gear including means responsive to angular deceleration of said first gear and linear deceleration of said vehicle,
   said means comprising a flywheel inertia member constructed to rotate with said second gear and adapted to move relative to said support means in the direction of its axis of rotation,
   the linear deceleration of said vehicle tending to move said second gear in one axial direction,
   the angular deceleration of said first gear causing thrust forces between the helical teeth of the first and second gears tending to move said second gear in the opposite axial direction,
   the resultant axial displacement of said second gear being in indication of wheel skid.

7. A device according to claim 6 and including:
   one of said gears having right-hand teeth of a 45° helix angle,
   the other of said gears having left-hand teeth of a 45° helix angle.

8. A device according to claim 7 and including:
   biasing means adapted to urge said second gear into a normal axial position,
   switch means actuated by said second gear upon displacement of said second gear in the direction of its axis of rotation in response to wheel skid.

9. A device according to claim 6 and including:
   biasing means adapted to urge said second gear into a normal axial position.

10. A device according to claim 6 and including:

switch means actuated by said second gear upon displacement of said second gear in the direction of its axis of rotation in response to wheel skid.

11. A device to detect wheel skid during braking of a wheeled vehicle comprising:

support means mounted to said vehicle, a pair of meshing gears rotatably mounted on said support means, said gears having teeth directed nonparallel to their respective axes of rotation, one of said gears having an axis of rotation extending generally parallel to the direction of motion of said vehicle, said one gear including inertia means displaceably responsive to angular deceleration of said first gear and to linear deceleration of said vehicle, said one gear being adapted to move relative to said support means in the direction of its axis of rotation in response to gear tooth thrust forces acting thereon, said thrust forces opposing inertia forces acting on said one gear due to deceleration of said vehicle, whereby the axial displacement of said one gear is an indication of wheel skid.

References Cited

UNITED STATES PATENTS

| | | | |
|---|---|---|---|
| 639,470 | 12/1899 | Troubetzkoy | 73—514 |
| 2,816,749 | 12/1957 | Oberle | 73—512 |
| 2,908,853 | 10/1959 | Laky et al. | 192—150 |
| 2,992,859 | 7/1961 | Sampietro | 303—24 |
| 3,319,298 | 5/1967 | Kirazy | 192—150 |

MILTON BUCHLER, Primary Examiner

J. J. McLAUGHLIN, Assistant Examiner

U.S. Cl. X.R.

73—514; 74—424.5; 188—181; 200—61.45; 303—24